Sept. 26, 1950  F. C. SCHUELER  2,523,670
PROCESS OF PRODUCING PLASTIC PATTERNS
OF IRREGULAR OUTLINES Filed June 5, 1946  3 Sheets-Sheet 1

Inventor Fred C. Schueler
by Gardner W. Pearson
Attorney

Sept. 26, 1950 F. C. SCHUELER 2,523,670
PROCESS OF PRODUCING PLASTIC PATTERNS
OF IRREGULAR OUTLINES
Filed June 5, 1946 3 Sheets-Sheet 2
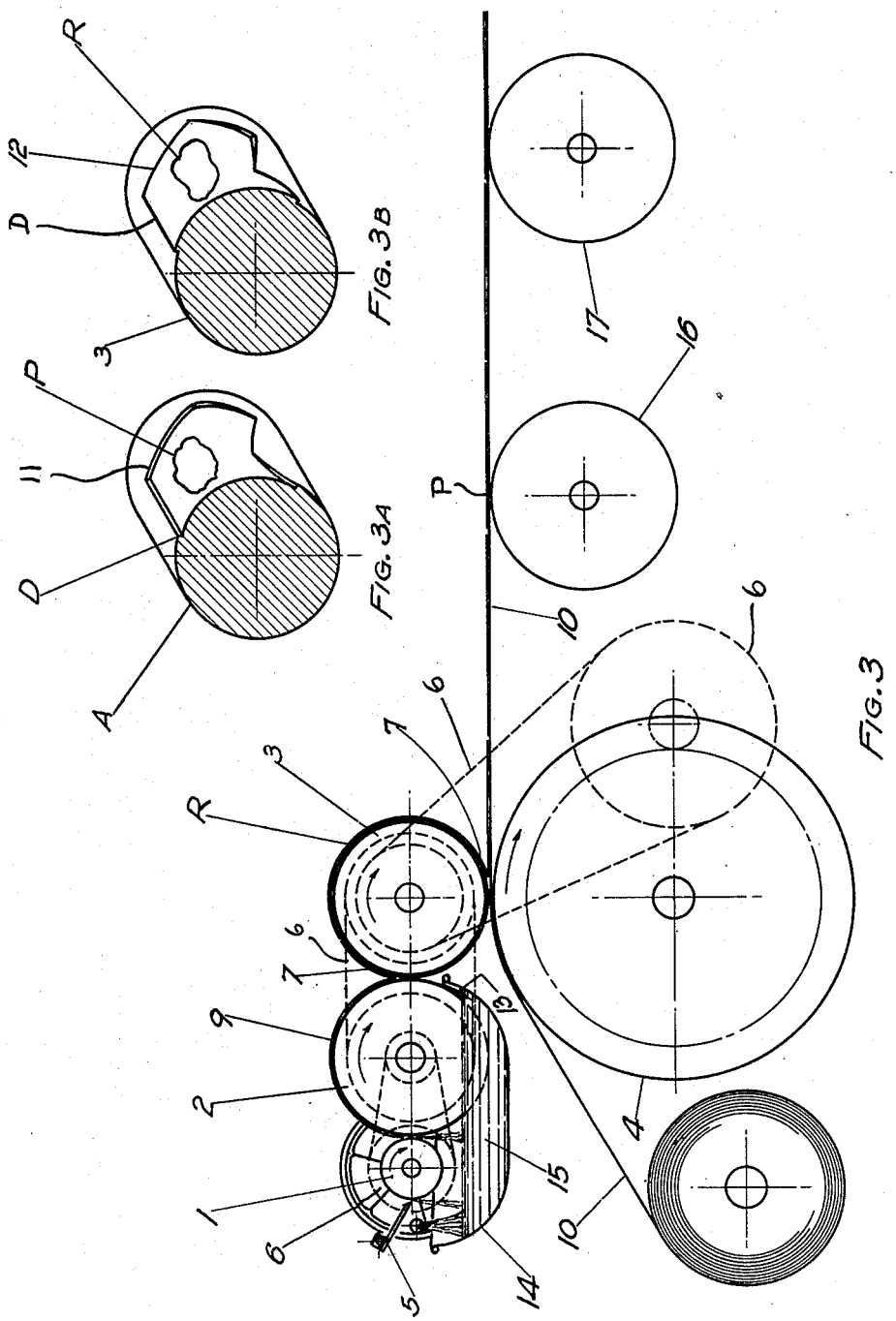

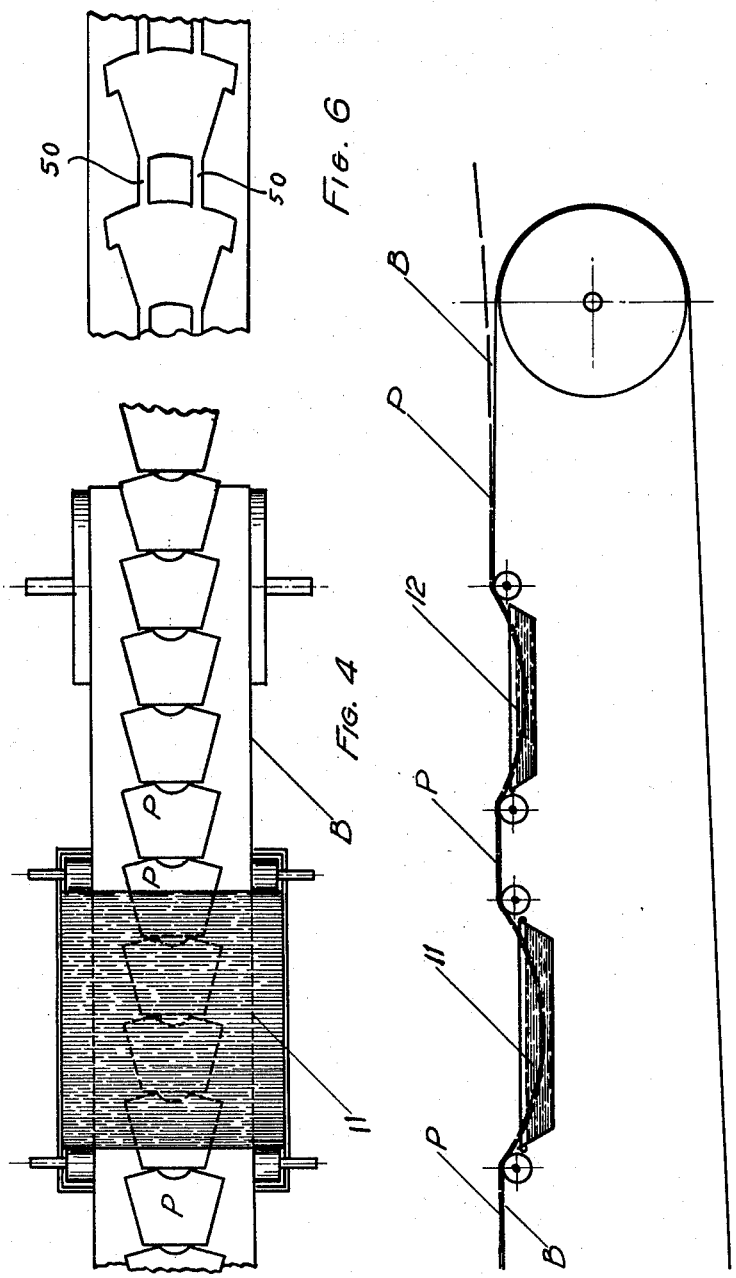

UNITED STATES PATENT OFFICE 2,523,670

PROCESS OF PRODUCING PLASTIC PATTERNS OF IRREGULAR OUTLINES

Fred C. Schueler, Fulton, N. Y., assignor to The Schueler Engineering Co., a partnership Application June 5, 1946, Serial No. 674,618

6 Claims. (Cl. 18—57)

This invention is a process for continuously producing patterns of irregular outline of plastic in place of the usual method of taking a sheet of a finished plastic and cutting patterns from it.

It might properly be called a process of printing plastic patterns or casting flat plastic patterns of irregular outlines.

My purpose is to do away with the present processes of cutting from a sheet the different irregular shaped pattern parts of such things as raincoats, clothing of other types, and any other articles made of thin sheets of plastic, usually of a waterproof type, and it may be used not only to form the patterns but in some cases to attach the patterns together so as to form a complete garment.

Sheet plastics are now made or cast by picking up a thin film of the plastic of the desired consistency and of uniform width on a roll or other conveyor, sometimes using means to make it of the same thickness everywhere, and then carrying this along and so treating it that it will become less fluid and finally so curing it, either by heat treatment, evaporation or in some other way, that it can be handled as a sheet or as part of a roll of uniform width and of an indefinite length.

The advantages of my invention are that instead of forming a web of constant width, then unrolling, cutting off sections, laying them flat, and cutting or dieing out the desired patterns of irregular outline on the edges, mine is a continuous process which takes the place of all the above operations and therefor is much faster, saves labor and not only saves waste but produces a predetermined pattern of irregular outline with no waste whatever.

By irregular outline I mean as distinguished from a sheet with parallel sides.

I accomplish my purpose by utilizing such known printing processes as gravure, intaglio or off-setting reproductions or by printing from raised type and by substituting for ink or coloring matter a suitable plastic which is deposited in a depression of the desired form of pattern or on the face of type in bas relief, in either case levelling off such a deposit on a revolving printing roll and of then removing such plastic to an intermediate apron or directly to a conveyor belt which conveyor belt passes into or through a heat treating oven which sets the plastic so that it can be removed from the conveyor maintaining the shape of the pattern on the printing roll.

I provide a plastic of the necessary consistency and then pick it up, preferably on an applicator roll which has a series of depressions such as are used in gravure printing or on raised type or its counterpart, these designs preferably being connected one with the other so that they extend entirely around the applicator roll and of irregular outline on their edges.

Whether the roto-gravure, intaglio or cut in pattern method is used or the raised type pattern method, when the plastic is picked up and carried along, it may or may not be smoothed down or its thickness regulated as by doctor blades or in some other way.

I find it very convenient to lay out the starting pattern of the design on the printing, design carrying or applicator roll distorted and elongated as compared to the desired pattern and to then remove it therefrom to a moving surface, such as a conveyor, which is moving at a surface speed which is substantially as much slower as the ratio of the length of the pattern on the printing roll is to that of the desired pattern on the conveyor so that the final pattern as carried thereby will be thicker in the same proportion.

It is an established, known scientific fact that when a thickened or unthickened pattern of a flowable liquid is produced by placing it on a nonabsorbing surface, the edges are not straight planes as when a pattern is cut, but are rounded as the internal stresses of the flowable plastic must produce such a result.

It is removed from this applicator roll and carried onto a belt conveyor usually of the endless type where it is so treated as by heat or otherwise that it loses any tendency to flow and from there it is carried through an oven or setting device which sets it and makes it tough enough to be handled and used.

The connected patterns of whatever shape is desired can then be cut apart or they can be rolled up in a helical form for shipment or they can be carried along and joined with other suitable patterns to be connected together thus forming a more or less complete garment.

In other words, the back of a garment can be cast or formed by my primary method and the two sides of the front on another or other similar mechanisms while a third mechanism places a protecting sheet between the back and the two front parts except along the edges and these edges may then, with certain types of plastics be fastened together by heat, or they may be fastened by stitching or in many other ways.

In carrying out my process of casting shaped patterns, each of a substantially uniform thickness, I may use several different machines and modifications which are shown in the accompanying diagrammatic drawings.

As the word applicator roll is used in the plastic industry to indicate a roll which picks up a film of uniform width and thickness, I will use printing roll for a similar roll but one on which there are designs of irregular outline on their edges.

By this I mean that the edges of the body of the design and of the body of the pattern picked up by and carried by the design are of irregular outline or more generally are not straight parallel lines.

All the drawings are substantially diagrammatic as they show my process carried out on known types of printing or casting machines, the parts of which are arranged or rearranged for my particular process. For clearness, in Figs. 2 and 5, the line of connected patterns P is indicated by a line of dashes to prevent it from being merged with the conveyor.

Fig. 3 is a diagrammatic side elevation showing a ductor, applicator and printing roll with raised or bas relief designs delivering formed patterns to an endless conveyor of paper.

Fig. 3A is an isometric view of a section of a printing roll with a recessed or intaglio design cut into it, and indicating a pattern as formed on the design.

Fig. 3B is an isometric view similar to Fig. 3A but showing a printing roll with a raised or bas relief design and with a pattern deposited on the raised design.

Fig. 4 is a plan view of a modification in which a single chemical setting bath is used.

Fig. 5 is a side elevation showing two chemical setting baths.

Fig. 6 is a detail of a set of finished patterns the members of which are connected by strips which can be cut off before using the actual desired pattern.

Figure 1:
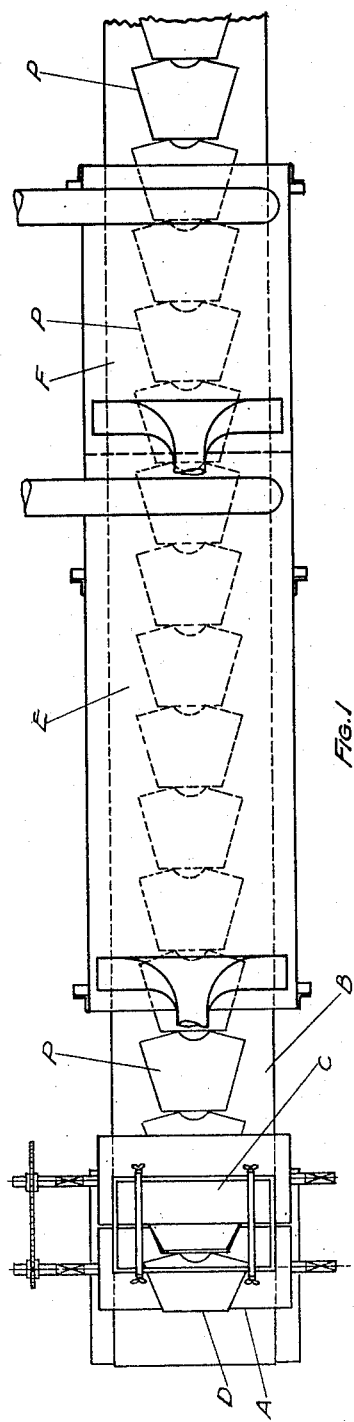
Fig. 1 is a diagrammatic plan view and Fig. 2, a diagrammatic side elevation showing one arrangement of printing roll with intaglio or cut in designs associated with a conveyor of the endless type.
Figure 2:
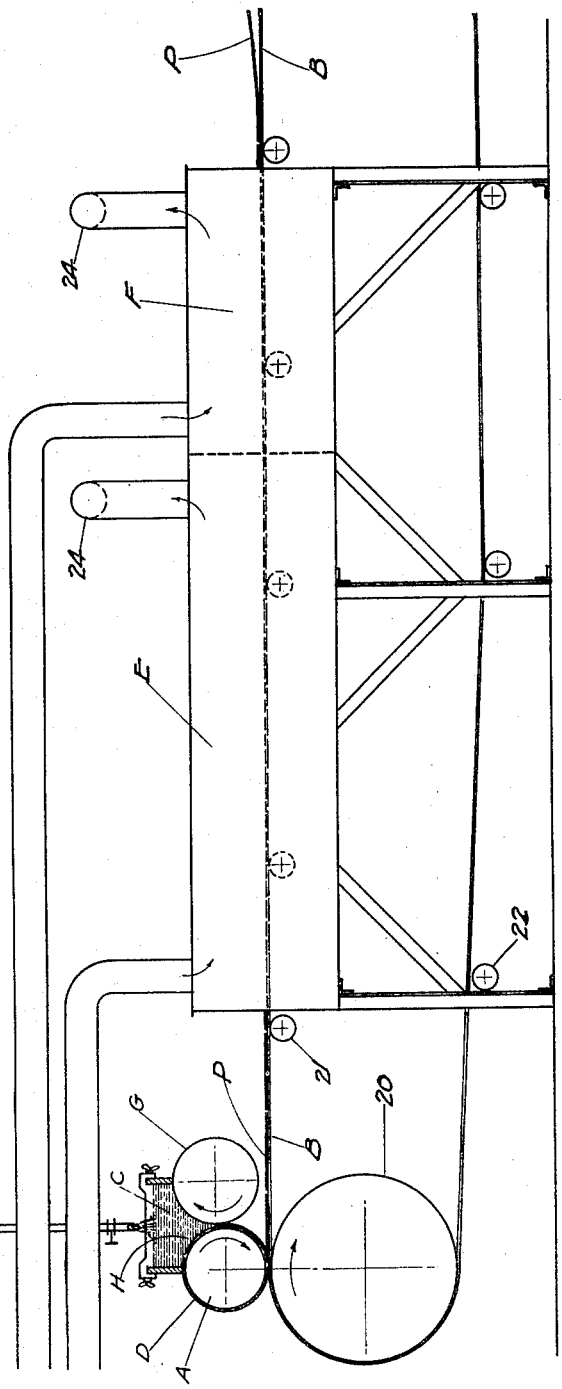

In the diagrammatic drawings, Figs. 1 and 2 show a typical and preferred mechanism for carrying out my process of casting, printing or producing flat plastic patterns of irregular outline.

In the drawings, A represents what I will call an applicator or printing roll around the surface of which there are formed repetitions of the design D for a pattern P which it is desired to produce.

As shown in Fig. 1, these patterns P and the corresponding designs D are connected and extend continuously around roll A, although they might be connected by short strips 50 as shown in Fig. 6 or they might not be connected.

20 represents one of the driving rolls for an endless conveyor belt B which preferably is guided and to some extent supported by the idler rolls 21 and 22. This conveyor belt B runs through what I call an evaporating oven E and from thence through what I will call a fusing oven F. Conveyor B may be of metal.

C is a coating pan which is kept supplied as by a pipe 23 with a fluid, liquid, or flowable plastic H such for instance as "Vinylite."

Figs. 1 and 2 show the use of a printing roll A with an intaglio or cut in design D. As shown, the suitable flowable plastic H is deposited in the recessed designs 11 and whatever is caught on the smooth surface of roll A is removed by roll G and returned or retained in the coating pan C. This roll G helps to spread the plastic evenly in the depression 11 and serves the purpose of a doctor or ductor roll.

To transfer the patterns P carried by design D on roll A for curing, I show an endless conveyor belt B which is carried by rolls such as 20 so that the face of B is in contact with the face of roll A but is moving at the point of contact in a different direction, the result of which is that, in a well known manner to form a film with straight parallel edges, the connected patterns P are picked off or transferred from roll A to belt B. The adjoining curve faces of design roll A and of belt B may be in actual contact along certain proximate or adjoining lines or in contact at some design segments and not at spaces between them or vice versa or merely in close proximity so as to wipe, cast or peel the pattern on the design from the roll to the conveyor belt. Belt B passes through and also carries these connected patterns P through the evaporating oven E where, with this type of plastic the soluble or volatile part is removed and passes out as through a vapor outlet 24. Conveyor B continues to travel with the pattern P and passes through the fusing oven F where the plastic patterns P, P, are set. The connected plastic patterns P are now of such a consistency that they can be removed from the conveyor.

In this particular type I may use a thermoplastic plastic of the vinyl-resin plastic type such as the polystyrenes and polychloroprenes and a copolymerization of vinyl chloride and vinyl acetate such as Vinylite. I will call these generally vinyl-plastics.

I may use in a flowable condition any of the heat setting resins, which are usually referred to as thermo-setting plastics and others of the thermo-plastic types and may also use other plastics such as those known as solution coatings or dispersion coatings where there is a more or less solid material in a liquid solution.

Any such flowable material when transferred from the printing roll to the conveyor as a design of irregular outline will have edges which are rounded and are not flat planes.

With the Vinylite I use in the evaporating oven a temperature of 250 to 275 degrees Fahrenheit and from 375 degrees Fahrenheit upward for fusing.

I preferably use an evaporating oven to stiffen a flowable plastic of the vinyl class which contains a volatile solvent as specified above and a fusing oven for a final setting to make the pattern produced pliable and of a consistency to be removed, handled and bodily transported.

As shown, rolls A and G both engage the suitable plastic H and are so adjusted that their curved faces are in such close contact that only the cut in designs D for patterns P on roll A take up the plastic H.

It will be noted that rolls A, G, and 20, as shown, are all running in a clockwise direction so that their lines of contact are running in opposite directions as this is the best way to form a plastic film, whether it is of the usual type with parallel edges or of my pattern casting designs.

In Fig. 3 and Fig. 3B, I show another arrangement which is especially useful with a printing roll such as P with a raised design such as 12. To spread a thin layer of a suitable flowable plastic of the right thickness on the face of a design D on a raised part 12, I find it is desirable to use a doctor blade or knife such as 5 in connection with a ductor roll 1, the face of which is in contact with the face of a plastic carrier roll 2. In this case roll 2 revolves in a suitable coating pan 14 containing the flowable plastic 15 and picks up a certain amount which is spread and evened by the ductor roll 1. Preferably by the means of the doctor knife 5, any material which clings to the roll 1 after it spreads an even layer of smooth film 9 on roll 2 is removed so that the contacting face of roll 1 with roll 2 is always clean and free.

The roll 1 through the medium of suitable belts and pulleys indicated by 6 is driven at a much slower surface speed than roll 2 and printing or design roll 3 should be driven at a much slower surface speed than roll 4 and conveyor 10 if an elongated design R of the starting pattern is used. I find a ratio of 3 to 1 in length of a design such as D to a final pattern such as P and of the surface speed of roll 2 to the surface speed of a conveyor such as 10 is convenient.

Roll 3 is shown as having raised pattern designs 12 of the desired form which project from its face, in contact with carrier roll 2. As the adjoining contact faces move in opposite directions roll 3 or rather the design 12 thereon removes only that part 7 of the film which corresponds with such pattern design 12 thus forming a pattern P. The rest 13 of film 9 continues on roll 2 and is merged with the rest of the plastic 15 in the coating pan 14 in which applicator roll 2 revolves.

The next roll is marked 4 and as shown, instead of carrying an endless conveyor, conveys a long roll of paper 10 of suitable consistency, roll 3 being pressed down against this paper and roll 4 so that, as the adjoining surfaces are moving in opposite directions, the pattern 7 is transferred to the continuous paper conveyor which may go through a furnace such as E and another furnace such as F or the conveyor may travel over heated rolls such as 16 and 17 for a partial and a complete setting.

As shown in Fig. 4, a conveyor of the continuous type or of the type 10, which might be of sheet metal, may carry suitable plastic patterns along, over or through devices such as shown in Figs. 1 and 2 but it might pass through a chemical bath 11 or through two baths 11 and 12, as shown in Fig. 5, whereby the films are first set or hardened and then made into what might be called a flexible plastic or in other words, a plastic which is tough and bendable and suitable for such articles as cloth or garments as distinguished from the hard thermo-setting plastics or heat setting plastics such as are suitable for a number of other purposes.

In the specification and claims the word "design" is intended to indicate the picture of the appearance of an article and this is further limited as by the word "silhouette" to distinguish from a line picture or multicolored picture. The word "pattern," particularly "final pattern," means and is a bodily transportable film of plastic, particularly of the vinyl class, of irregular outline or perimeter as distinguished from one with parallel sides and as distinguished from a superficial design or picture imposed on a backing.

I claim:

1. The process of producing flat thin patterns of irregular outline of flexible plastic material, which consists of spreading a thin layer of a flowable plastic on a design which is formed on a printing roll in the form of a starting pattern the edges of the body of which are of irregular outline which is in elongation of the desired pattern, of transferring the starting pattern of such material so spread and formed on such a printing roll to a conveyor which is moving at a surface speed substantially as much slower than that of the printing roll as the ratio of the length of the elongated starting design is to that of the desired final pattern, which conveyor carries such pattern to and past means for setting the plastic material of the final pattern until it is of a consistency to be removed from the conveyor, and of then so removing it.

2. The process of producing flat thin patterns of irregular outline of flexible plastic material, which consists of spreading a layer of a flowable plastic on a design which is formed on a printing roll in the form of a starting pattern the edges of the body of which are of irregular outline which is in elongation of the desired pattern, of transferring the starting pattern of such material so spread and formed on such a printing roll to a conveyor which is moving at a slower surface speed than that of the printing roll, which conveyor carries such pattern to and past means for setting the plastic material of the final pattern until it is of a consistency to be removed from the conveyor, and of then so removing it.

3. The process of producing final predetermined flat thin patterns the edges of the body of which are of irregular outline of flexible plastic material, which consists of spreading a thin layer of a flowable plastic on a design which is formed on a printing roll in the form of a distorted starting pattern of irregular outline which is in elongation of the desired pattern, of transferring the starting pattern of such material so spread and formed on such a printing roll to a conveyor which is moving at a surface speed substantially as much slower than that of the printing roll as the ratio of the length of the elongated starting design is to that of the desired final pattern, which conveyor carries such pattern to and past means for setting the plastic material of the final predetermined pattern until it is of a consistency to be removed from the conveyor, and of then so removing it.

4. The process of producing final predetermined flat thin connected patterns the edges of the body of which are of irregular outline of flexible plastic material of uniform thickness and edges of irregular outline, which consists of spreading a thin layer of a flowable plastic on a design which is formed on a printing roll in the form of a distorted starting pattern of irregular outline which is in elongation of the desired pattern, of transferring the starting pattern of such material so spread and formed on such a printing roll to a conveyor which is moving at a surface speed substantially as much slower than that of the printing roll as the ratio of the length of the elongated starting design is to that of the desired final pattern, which conveyor carries such pattern to and past means for setting the plastic material of the final predetermined pattern until it is of a consistency to be removed from the conveyor, and of then so removing it.

5. The process of producing final predetermined flat thin patterns the edges of the body of which are of irregular outline of flexible plastic material of uniform thickness and edges of irregular outline, which consists of spreading a thin layer of a flowable plastic on a design which is formed as a raised design on a printing roll in the form of a distorted starting pattern of irregular outline which is in elongation of the desired pattern, of transferring the starting pattern of such material so spread and formed on such a printing roll to a conveyor which is moving at a surface speed substantially as much slower than that of the printing roll as the ratio of the length of the elongated starting design is to that of the desired final pattern, which conveyor carries such pattern to and past means for setting the plastic material of the final predetermined pattern.

6. The process of producing final predetermined flat thin patterns of irregular outline of flexible plastic material of uniform thickness and the edges of the body which are of irregular outline, which consists of depositing a thin layer of a flowable plastic on a design which is formed on a printing roll in the form of a distorted starting pattern of irregular outline which is in elongation of the desired pattern, of transferring the starting pattern of such material so spread and formed on such a printing roll to a conveyor which is moving at a surface speed substantially as much slower than that of the printing roll as the ratio of the length of the elongated starting design is to that of the desired final pattern and proximate the surface of the printing roll in the opposite directions to such proximate surface, so that the conveyor carries such predetermined but thickened plastic pattern to and past means for setting the plastic material of the final predetermined pattern.

FRED C. SCHUELER.

REFERENCES CITED

The following references are of record in the file of this patent:

UNITED STATES PATENTS

| Number | Name | Date |
| --- | --- | --- |
| 995,652 | Baj | June 20, 1911 |
| 1,401,965 | Crowell | Jan. 3, 1922 |
| 1,583,484 | Morrison et al. | May 4, 1926 |
| 1,905,061 | Sax | Apr. 25, 1933 |
| 2,001,389 | Kratz | May 14, 1935 |
| 2,020,687 | Kinsella | Nov. 12, 1935 |
| 2,039,229 | Krutz | Apr. 28, 1936 |
| 2,193,899 | Casto et al. | Mar. 19, 1940 |
| 2,391,619 | Doolittle | Dec. 25, 1945 |